United States Patent
Kobayashi et al.

(10) Patent No.: US 12,541,283 B2
(45) Date of Patent: Feb. 3, 2026

(54) MOTION STATE MONITORING SYSTEM, METHOD FOR CONTROLLING THE SAME, AND NON-TRANSITORY COMPUTER-READABLE MEDIUM

(71) Applicant: TOYOTA JIDOSHA KABUSHIKI KAISHA, Toyota (JP)

(72) Inventors: Makoto Kobayashi, Nisshin (JP); Hiroto Ichikawa, Seto (JP); Shuhao Chang, Kitanagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/826,412

(22) Filed: Sep. 6, 2024

(65) Prior Publication Data

US 2025/0130683 A1   Apr. 24, 2025

(30) Foreign Application Priority Data

Oct. 24, 2023 (JP) .................. 2023-182860

(51) Int. Cl.
  *G06F 3/04817*   (2022.01)
  *G06F 3/01*   (2006.01)

(52) U.S. Cl.
  CPC .......... *G06F 3/04817* (2013.01); *G06F 3/011* (2013.01)

(58) Field of Classification Search
  CPC .... G06F 3/04817; G06F 3/011; A61B 5/1116; A61B 5/6802
  See application file for complete search history.

(56) References Cited

U.S. PATENT DOCUMENTS

| | | | |
|---|---|---|---|
| 2016/0346609 A1* | 12/2016 | Bailly | G06F 3/011 |
| 2021/0195732 A1* | 6/2021 | Longinotti-Buitoni | H05K 3/361 |
| 2022/0054042 A1 | 2/2022 | Kobayashi et al. | |
| 2022/0054044 A1 | 2/2022 | Kobayashi et al. | |
| 2022/0054045 A1 | 2/2022 | Kobayashi et al. | |
| 2022/0057233 A1 | 2/2022 | Kobayashi et al. | |

FOREIGN PATENT DOCUMENTS

| | | |
|---|---|---|
| JP | 2022-034407 A | 3/2022 |
| JP | 2022-034448 A | 3/2022 |
| JP | 2022-034449 A | 3/2022 |
| JP | 2022-034450 A | 3/2022 |

* cited by examiner

*Primary Examiner* — Daryl C Pope
(74) *Attorney, Agent, or Firm* — Oliff PLC (57) ABSTRACT

A motion state monitoring system according to the present disclosure is a motion state monitoring system configured to monitor a motion of a subject in accordance with a result of detection sent from each of a plurality of measuring instruments attached to a plurality of respective body parts of a body of the subject, the motion state monitoring system including: a display unit configured to display a plurality of sensor icons made to correspond to the plurality of respective measuring instruments; and a control unit configured to cause, in accordance with display forms of the plurality of the sensor icons, the plurality of measuring instruments corresponding to the respective sensor icons to perform operations different from each other.

8 Claims, 6 Drawing Sheets

MOTION STATE MONITORING SYSTEM, METHOD FOR CONTROLLING THE SAME, AND NON-TRANSITORY COMPUTER-READABLE MEDIUM

CROSS REFERENCE TO RELATED APPLICATIONS

This application is based upon and claims the benefit of priority from Japanese patent application No. 2023-182860, filed on Oct. 24, 2023, the disclosure of which is incorporated herein in its entirety by reference.

BACKGROUND

The present disclosure relates to a motion state monitoring system, a method for controlling the same, and a control program.

Japanese Unexamined Patent Application Publication No. 2022-34448 discloses a motion state monitoring system that monitors a motion state of a subject based on a result of detection by a plurality of sensors attached to a plurality of respective body parts of a body of the subject.

SUMMARY

When a setting of a sensor (e.g., making a sensor correspond to a body part) is performed using a sensor icon displayed on a display unit of a terminal, there is a problem that it is difficult to determine which sensor the sensor icon corresponds to.

The present disclosure has been made in view of the aforementioned circumstances and an object thereof is to provide a motion state monitoring system, a method for controlling the same, and a control program by which it is possible to reduce the difficulty of determining which sensor a sensor icon on a display unit corresponds to.

A motion state monitoring system according to the present disclosure is a motion state monitoring system configured to monitor a motion of a subject in accordance with a result of detection sent from each of a plurality of measuring instruments corresponding to a plurality of respective body parts of a body of the subject, the motion state monitoring system including:
 a display unit configured to display a plurality of sensor icons made to correspond to the plurality of respective measuring instruments; and
 a control unit configured to cause, in accordance with display forms of the plurality of the sensor icons, the plurality of measuring instruments corresponding to the respective sensor icons to perform operations different from each other.

The motion state of the subject may be estimated using a trained model generated by machine learning or the like.

The control unit may execute processing for making a display color of each of the sensor icons identical to a light emitting color of a light emitting unit provided in the measuring instrument corresponding to the sensor icon.

The control unit may change a display form of a selected sensor icon and cause the measuring instrument corresponding to the selected sensor icon to perform a predetermined operation.

The predetermined operation may be an operation for making the light emitting unit provided in the measuring instrument flash on and off. The predetermined operation may be an operation for outputting a sound from the measuring instrument.

The predetermined operation may be an operation for vibrating the measuring instrument.

The predetermined operation may be an operation for emitting an aroma from the measuring instrument.

A method for controlling a motion state monitoring system according to the present disclosure is a method for controlling a motion state monitoring system configured to monitor a motion of a subject in accordance with a result of detection sent from each of a plurality of measuring instruments corresponding to a plurality of respective body parts of a body of the subject, the method including:
 causing a display unit to display a plurality of sensor icons made to correspond to the plurality of respective measuring instruments; and
 causing, in accordance with display forms of the plurality of the sensor icons, the plurality of measuring instruments corresponding to the respective sensor icons to perform operations different from each other.

A control program according to the present disclosure is a control program for causing a computer to execute control processing in a motion state monitoring system configured to monitor a motion of a subject in accordance with a result of detection sent from each of a plurality of measuring instruments corresponding to a plurality of respective body parts of a body of the subject, the control processing including:
 causing a display unit to display a plurality of sensor icons made to correspond to the plurality of respective measuring instruments; and
 causing, in accordance with display forms of the plurality of the sensor icons, the plurality of measuring instruments corresponding to the respective sensor icons to perform operations different from each other.

According to the present disclosure, it is possible to provide a motion state monitoring system, a method for controlling the same, and a control program by which it is possible to reduce the difficulty of determining which sensor a sensor icon on a display unit corresponds to.

The above and other objects, features and advantages of the present disclosure will become more fully understood from the detailed description given hereinbelow and the accompanying drawings.

DESCRIPTION OF EMBODIMENTS

The present disclosure will be described hereinafter through embodiments of the present disclosure. However, the disclosure according to the claims is not limited to the following embodiments. Further, all the components/structures described in the embodiment are not necessarily essential as means for solving the problem. For the clarification of the description, the following descriptions and the drawings are partially omitted and simplified as appropriate. The same elements are denoted by the same reference numerals or symbols throughout the drawings, and redundant descriptions are omitted as necessary.

First Embodiment

Figure 1:
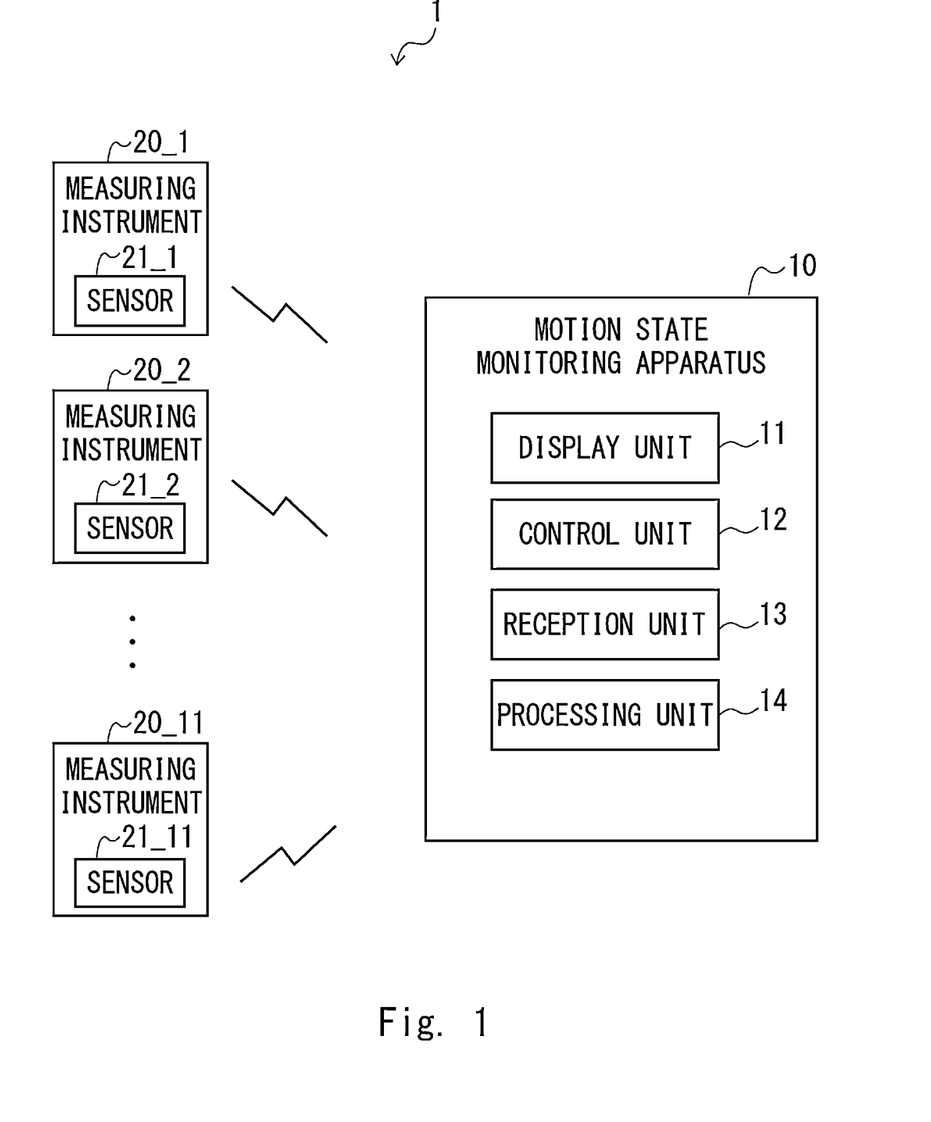
FIG. 1 is a block diagram showing an example of a configuration of a motion state monitoring system according to a first embodiment.

FIG. 1 is a block diagram showing a configuration example of a motion state monitoring system 1 according to first embodiment. The motion state monitoring system 1 is a system that monitors a motion state of a subject. By a result of the monitoring, for example, a user, such as an assistant, can provide support for making the motion of the subject close to a desired motion. The details thereof will be described below.

As shown in FIG. 1, the motion state monitoring system 1 includes a motion state monitoring apparatus 10 and a plurality of measuring instruments 20. The motion state monitoring apparatus 10 itself can be referred to as a motion state monitoring system. The motion state monitoring apparatus 10 and the plurality of measuring instruments 20 are configured so that they can communicate with each other through a wired or wireless network. Note that the motion state monitoring apparatus 10 and the plurality of measuring instruments 20 may perform radio communication conforming to the Bluetooth (registered trademark) standard, and short-range radio communication conforming to Near Field Communication (NFC), Ultra Wideband (UWB), WiFi (registered trademark), or the like. In this embodiment, an example of a case in which 11 of the measuring instruments 20 are provided will be described. In the following description, the 11 measuring instruments 20 are also referred to as measuring instruments 20_1 to 20_11, respectively, in order to distinguish them from each other.

The measuring instruments 20_1 to 20_11 are respectively attached to body parts p1 to p11 of a subject P from which motions are to be detected among various body parts of the body of the subject P, and detect the motions of the respective body parts p1 to p11 by using motion sensors (hereinafter simply referred to as sensors) 21_1 to 21_11 composed of gyro sensors, acceleration sensors, and the like. Note that the measuring instruments 20_1 to 20_11 are made to correspond to the respective body parts p1 to p11 by pairing processing performed with the motion state monitoring apparatus 10.

Each of the plurality of measuring instruments 20 may include a light emitting unit capable of changing a light emitting color. For example, a full color Light Emitting Diode (LED) may be used as the light emitting unit. As an 25 example, the light emitting unit may have a configuration in which a red LED chip, a green LED chip, and a blue LED chip are sealed with a resin having light transmissivity. By controlling the brightness of three types of the LED chips, the light emitting unit can realize a variety of light emitting colors.

Note that a plurality of sensors 21 may include hardware (e.g., a speaker, a vibration motor, an aroma emitting unit, a low frequency current generating apparatus, an electronic paper, a display, a thermoelectric element, a shape changing unit, etc.) other than the light emitting unit. The aroma emitting unit includes, for example, a perfume and a shutter.

Further, each of the measuring instruments 20 may include a control unit that controls hardware such as LEDs. The control unit may include a processor and a memory storing various types of control programs. In this case, the control unit has a function as a computer and performs processing based on various types of control programs.

Figure 2:
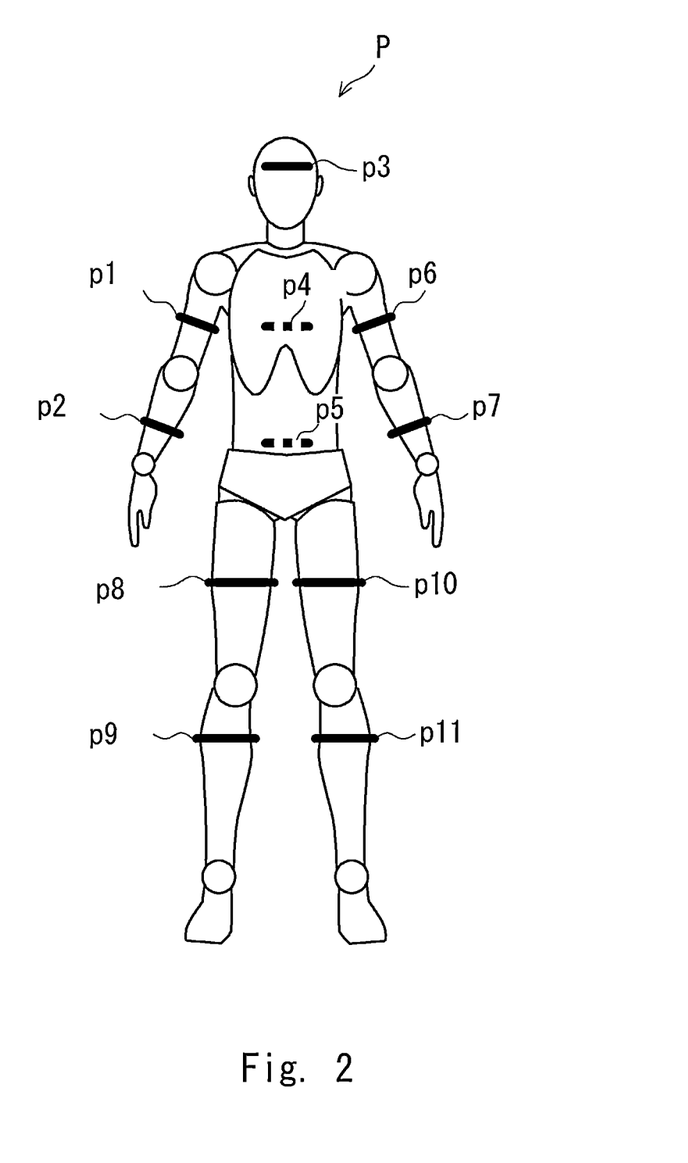
FIG. 2 is a diagram showing an example of body parts of a subject to which measuring instruments are to be attached.

FIG. 2 is a diagram showing an example of body parts of the subject P to which the measuring instruments 20_1 to 20_11 are to be attached. In the example shown in FIG. 2, the body parts p1 to p11 to which the respective measuring instruments 20_1 to 20_11 are to be attached are a right upper arm, a right forearm, a head, a chest (a trunk), a waist (a pelvis), a left upper arm, a left forearm, a right thigh, a right lower leg, a left thigh, and a left lower leg, respectively. Note that it is not necessary to attach all of the measuring instruments 20_1 to 20_11 to the body of the subject P. It is only necessary to attach, among the measuring instruments 20_1 to 20_11, only the measuring instrument(s) required to measure a motion to be monitored (including the movement of the body part) which a user wants to monitor to the body of the subject P.

Examples of the motion to be monitored include motions such as bending and stretching of the right shoulder, adduction and abduction of the right shoulder, internal and external rotation of the right shoulder, bending and stretching of the right elbow, pronation and supination of the right forearm, bending and stretching of the head, rotation of the head, bending and stretching of the chest and the waist, rotation of the chest and the waist, lateral bending of the chest and the waist, bending and stretching of the left shoulder, adduction and abduction of the left shoulder, internal and external rotation of the left shoulder, bending and stretching of the left elbow, and pronation and supination of the left forearm. Further, the motion to be monitored includes movement of the body part to which a sensor is attached.

The motion to be monitored also includes, for example, an angle of the joint of the body of the subject P to be measured based on results of the detection by a plurality of sensors and an angle of the joint in any coordinate system to be measured based on a result of the detection by one of the sensors. The motion to be monitored may be specified by a user such as an assistant.

In this example, it is assumed that a bending and stretching motion of the right elbow of the subject P is monitored. The bending and stretching motion of the right elbow can be measured based on a result of the detection by each of the sensor attached to the right upper arm (the body part p1) and the sensor attached to the right forearm (the body part p2). In this case, for example, one measuring instrument is attached to the right upper arm (the body part p1) while a different measuring instrument is attached to the right forearm (the body part p2) of the subject P.

Note that a user may select a plurality of different motions to be monitored simultaneously. For example, a user may select the "bending and stretching of the right elbow" and the "internal and external rotation of the right shoulder", or select the "bending and stretching of the left elbow" and the "internal and external rotation of the left shoulder".

It is possible to measure the bending and stretching motion of the right elbow based on a result of the detection by each of the sensors attached to the right upper arm (the body part p1) and the right forearm (the body part p2). Similarly, it is possible to measure the internal and external rotation motion of the right shoulder based on the result of the detection by each of the sensors attached to the right upper arm (the body part p1) and the right forearm (the body part p2). Further, it is possible to measure the bending and stretching motion of the left elbow based on a result of the detection by each of the sensors attached to the left upper arm (the body part p6) and the left forearm (the body part p7). Similarly, it is possible to measure the internal and external rotation motion of the left shoulder based on the result of the detection by each of the sensors attached to the left upper arm (the body part p6) and the left forearm (the body part p7).

Examples of Configurations of Measuring Instruments 20_1 to 20_11

Figure 3:
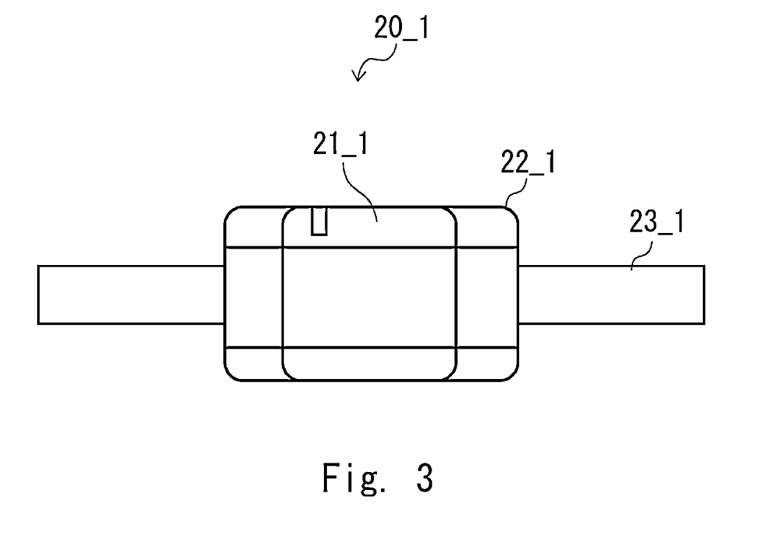
FIG. 3 is a diagram showing an example of a configuration of the measuring instrument provided in the motion state monitoring system according to the first embodiment.

FIG. 3 is a diagram showing an example of a configuration of the measuring instrument 20_1. Note that the configuration of each of the measuring instruments 20_2 to 20_11 is similar to that of the measuring instrument 20_1, and thus the descriptions thereof will be omitted.

As shown in FIG. 3, the measuring instrument 20_1 includes the sensor 21_1, an attachment pad 22_1, and a belt 23_1. The belt 23_1 is configured so that it can be wound around the body part of the subject P from which a motion is to be detected. The sensor 21_1 is integrated with, for example, the attachment pad 22_1. The attachment pad 22_1 with which the sensor 21_1 is integrated is configured so that it can be attached to or detached from the belt 23_1.

Hardware such as LEDs may be attached, for example, to the attachment pad 22_1 and the belt 23_1.

Figure 4:
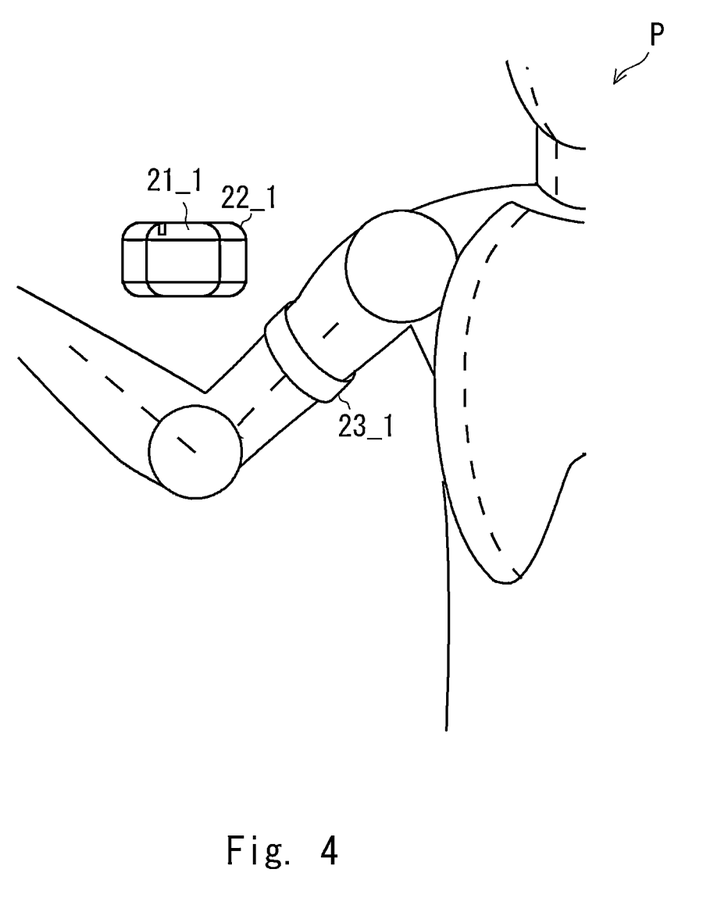
FIG. 4 is a diagram showing an example of how to attach the measuring instruments shown in FIG. 3 to a subject.

FIG. 4 is a diagram showing an example of how to attach the measuring instrument 20_1 to the subject P. In the example shown in FIG. 4, the belt 23_1 is wound around the right upper arm (the body part p1) which is one of the body parts of the subject P from which motions are to be detected. The sensor 21_1 is attached to the belt 23_1 with the attachment pad 22_1 interposed therebetween after processing for making the sensor 21_1 correspond to the body part to which it is to be attached, a calibration of the sensor 21_1, and the like have been completed.

Example of Configuration of Motion State Monitoring Apparatus 10

The motion state monitoring apparatus 10 is an apparatus that outputs a result of a calculation indicating a motion state of the subject P based on results (sensing values) of detection by the sensors 21_1 to 21_11. The motion state monitoring apparatus 10 may be, for example, one of a Personal Computer (PC), a mobile phone terminal, a smartphone, and a tablet terminal. The motion state monitoring apparatus 10 is configured so that it can communicate with the sensors 21_1 to 21_11 through a network (not shown). The motion state monitoring apparatus 10 can also be referred to as a motion state monitoring system. The motion state monitoring apparatus 10 may include a processor and a memory storing various types of control programs. In this case, the motion state monitoring apparatus 10 has a function as a computer and performs processing based on various types of control programs etc.

As shown in FIG. 1, the motion state monitoring apparatus 10 includes a display unit 11, a control unit 12, a reception unit 13, and a processing unit 14.

Figure 5:
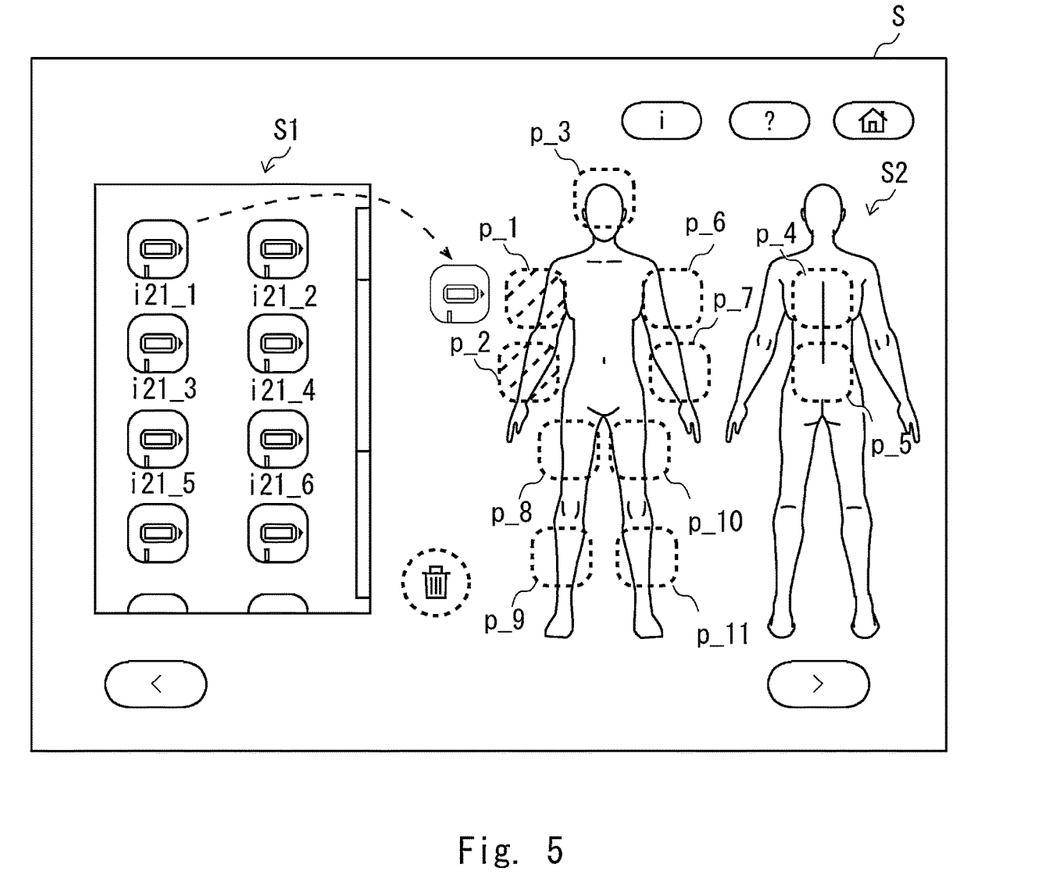
FIG. 5 is a diagram showing an example of a display screen.

The display unit 11, which is, for example, a display apparatus, displays a plurality of sensor icons respectively corresponding to a plurality of the sensors 21_1 to 21_11. FIG. 5 shows an example of a display screen S displayed on the display unit 11. An area in the display screen S where the sensor icon is displayed is defined as a sensor icon display area S1. The display screen including the sensor icon display area S1 includes a human body schematic diagram S2 showing the body parts to which the respective sensors are to be attached. The display screen S shown in FIG. 5 is displayed when an operation for making one of the plurality of the sensors 21 correspond to one of the body parts p of the subject P to which the respective sensors 21 are to be attached in a one-to-one manner is performed.

In the example shown in FIG. 5, the front side and the back side of the human body are separately displayed. The body parts p1 to p11 of the subject P to which the respective sensors are to be attached shown in FIG. 2 respectively correspond to the body parts p_1 to p_11 shown in the human body schematic diagram S2 of FIG. 5. In the following description, the body parts p_1 to p_11 shown in the human body schematic diagram S2 will be referred to as a right upper arm, a right forearm, a head, a back (a trunk), a waist (a pelvis), a left upper arm, a left forearm, a right thigh, a right lower leg, a left thigh, and a left lower leg, respectively, as appropriate. Further, the display unit 11, for example, can graph the results of the calculation based on the results of the detection by each of one or more sensors and display them.

The control unit 12 displays a plurality of sensor icons on the display unit 11. The control unit 12 may make the display forms (e.g., colors) of the plurality of sensor icons different from each other. For example, in FIG. 5, the display color of a sensor icon i21_1 may be red, the display color of a sensor icon i21_2 may be blue, the display color of a sensor icon i21_3 may be yellow, the display color of a sensor icon i21_4 may be green, and the display color of a sensor icon i21_5 may be light blue. The display color may be the color of the outer frame (e.g., a rounded rectangle) of the sensor icon.

Further, the control unit 12 may change the display form (e.g., a color, a shape) of the sensor icon selected by a tap operation or the like. For example, the display color of the selected sensor icon may be made to flash on and off. Further, the selected sensor icon may change to an icon indicating that the measuring instrument is outputting a sound, or to an icon indicating that the measuring instrument is vibrating. The control unit 12 may both make the colors of the plurality of sensor icons different from each other and change the display form of the selected sensor icon.

The control unit 12 causes, in accordance with the display forms of a plurality of sensor icons, a plurality of measuring instruments corresponding to the respective sensors to perform operations different from each other. Specifically, the control unit 12 controls an operation for outputting at least one of a sound, a text, a vibration, a movement, light, an aroma, a current, an image, and heat for alerting people present near the measuring instrument. The control unit 12 may execute processing for making the display color of each of the sensor icons identical to the light emitting color of the light emitting unit provided in the measuring instrument corresponding to the sensor icon. A user can select a sensor having the same light emitting color as the display color of the sensor icon, check the human body schematic diagram S2, and actually attach the sensor to the body part p of the subject P to which the sensor is to be attached. As a result, it is possible to prevent an error in the attachment of the sensor from occurring. The control unit 12 may transmit information indicating the light emitting color of the light emitting unit of the sensor to each of the sensors.

The control unit 12 may cause a measuring instrument corresponding to the sensor icon selected by a tap operation or the like performed by a user and other measuring instruments to perform operations different from each other. The control unit 12 changes the display form (e.g.: a color, flashing, shading) of the selected sensor icon and causes the measuring instrument corresponding to the selected sensor icon to perform a predetermined operation. The predetermined operation may be an operation for making the LED flash on and off. The predetermined operation may be an operation for outputting a sound from the measuring instrument, or an operation for vibrating the measuring instrument by a vibration motor or the like. The predetermined operation may be an operation for emitting an aroma from the measuring instrument by opening a shutter disposed between a perfume and the outside air. The predetermined operation may be an operation for supplying low-frequency current to a conductive material provided on a belt or the like of the measuring instrument. The predetermined operation may be an operation for displaying any character information or image information on a display or an electronic paper attached to the measuring instrument. The predetermined operation may be an operation for generating heat by operating a thermoelectric element. When a pad, a band, or the like of the measuring instrument is configured so that the shape thereof can be changed, the predetermined operation may be an operation for changing the shape of the band or the like.

The plurality of sensor icons described above are selected by a user to make the sensors 21 correspond to the body parts p to which the respective sensors 21 are to be attached. The reception unit 13 receives a setting operation for the sensor icon displayed on the display unit 11. The setting operation is an input operation for the sensor icon for making the sensor corresponding to the sensor icon correspond to one of the body parts p to which the respective sensors 21 are to be attached. For example, a user moves the sensor icon i21_1 displayed in the sensor icon display area SI to the right upper arm p_1 on the human body schematic diagram S2. Specifically, a user drags and drops the sensor icon i21_1 displayed in the sensor icon display area SI onto the right upper arm p_1 of the human body schematic diagram S2 by a mouse operation, a touch operation, or the like. This setting operation is indicated by a dotted line in FIG. 5. In this way, the reception unit 13 receives the setting operation for the sensor icon performed by a user.

Referring to FIG. 1, the processing unit 14 makes the sensor corresponding to the sensor icon correspond to the body part of the subject P to which the sensor is to be attached in accordance with the setting operation. This processing for making the sensor correspond to the body part to which it is to be attached is performed by performing pairing between the motion state monitoring apparatus 10 and the sensor 21 in advance and then associating identification information of the body part p to which the sensor 21 is to be attached with identification information of the sensor 21 on the application of the motion state monitoring apparatus 10.

By the motion state monitoring system 1 according to the first embodiment, it is possible to reduce the difficulty of determining which sensor a sensor icon on a display unit corresponds to.

Note that the setting operation is not limited to a drag-and-drop operation. The setting operation may be an operation input to the displayed attachment position. The reception unit 13 may receive the setting operation by a user clicking the sensor icon displayed in the sensor icon display area S1 and the body part to which the sensor is to be attached in the human body schematic diagram S2 within a predetermined time.

Further, the reception unit 13 may receive the setting operation by a user clicking the body part to which the sensor is to be attached in the human body schematic diagram S2. The processing unit 14 can automatically make one of the sensors corresponding to a plurality of respective sensor icons displayed on the display unit 11 correspond to the body part p of the subject P to which the sensor is to be attached in accordance with the above setting operation.

(Operation of Motion State Monitoring Apparatus 10)

Figure 6:
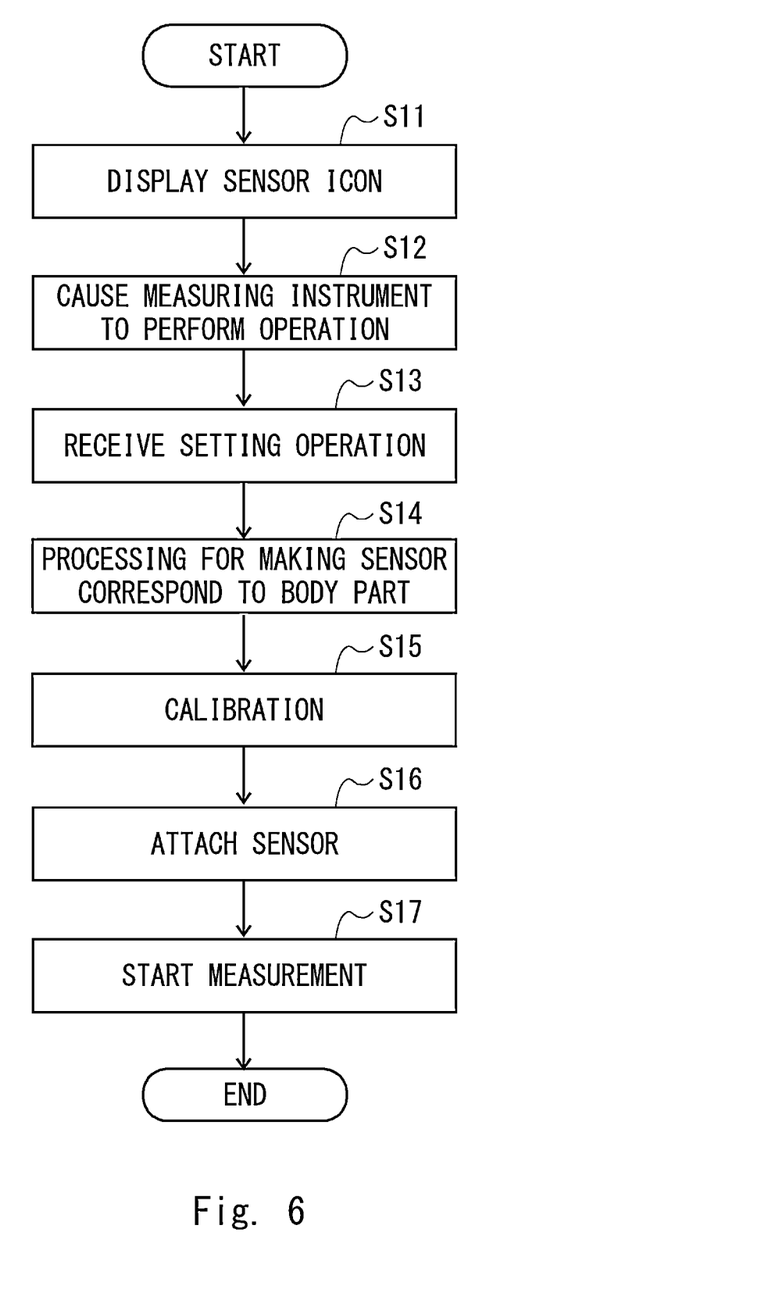
FIG. 6 is a flowchart showing operations performed by the motion state monitoring system shown in FIG. 1.

Next, operations performed by the motion state monitoring apparatus 10 will be described with reference to FIG. 6. FIG. 6 is a flowchart showing the operations performed by the motion state monitoring apparatus 10. As described above, it is assumed here that a bending and stretching motion of the right elbow of the subject P is monitored by the motion state monitoring apparatus 10. That is, a sensor is attached to each of the right upper arm (the body part p1) and the right forearm (the body part p2) of the subject P.

First, the motion state monitoring apparatus 10 displays a plurality of sensor icons i21_1 to i21_11 respectively corresponding to a plurality of measuring instruments on the display unit 11 (S11).

As shown in FIG. 5, the display unit 11 displays a display screen including the sensor icon display area S1 and the human body schematic diagram S2 showing the body parts to which the respective sensors are to be attached.

Note that, when a user specifies a motion to be monitored of the subject P, the display unit 11 may display the body part to which the sensor used to measure the specified motion to be monitored is to be attached. The display unit 11 of the motion state monitoring apparatus 10 may highlight (by a color, flashing, shading, etc.) the right upper arm p1 and the right forearm p2 so that they are displayed in a display form different from those of other body parts p3 to p11 shown in the human body schematic diagram S2. That is, the right upper arm p1 and the right forearm p2 may be displayed in a display form different from those of the other body parts p3 to p11 shown in the human body schematic diagram S2 of FIG. 5.

Then, the control unit 12 causes, in accordance with the display forms of a plurality of sensor icons, a plurality of measuring instruments corresponding to the respective sensors to perform operations different from each other (S12). The control unit 12 may make the display forms (e.g., colors) of the plurality of sensor icons different from each other and cause the measuring instruments respectively corresponding to the sensor icons to perform operations (e.g., emission of light having the same emitting color as the display color of the sensor icon) in accordance with the display forms. Further, the control unit 12 may change the display form (e.g., a color, a shape) of the selected sensor icon and cause the sensor corresponding to the selected sensor icon to perform a predetermined operation (e.g., an output of a sound).

Further, in the motion state monitoring apparatus 10, a user, for example, drags and drops one sensor icon i21_1 selected from among the sensor icons i21_1 to i21_11 displayed in the sensor icon display area S1 onto the right upper arm p_1 in the human body schematic diagram S2. By doing the above, the reception unit 13 receives the setting operation (S13).

After that, the motion state monitoring apparatus 10 associates identification information of the sensor 21_1 corresponding to the sensor icon i21_1 with identification information of the right upper arm (the body part p1) of the subject P to which the sensor 21_1 is to be attached in accordance with the setting operation. As a result, the sensor 21_1 is made to correspond to the right upper arm (the body part p1) of the subject P (S14). Note that, similarly, the sensor icon i21_2 is dragged and dropped onto another body part (the right forearm (the body part p2)), and the sensor 21_2 is made to correspond to the right forearm (the body part p2) of the subject. That is, S12 and S13 in FIG. 6 may be repeated as many times as the number of body parts of the subject to which the sensors are to be attached.

After the sensor 21_1 is made to correspond to the body part p1 to which the sensor 21_1 is to be attached and the sensor 21_2 is made to correspond to the body part p2 to which the sensor 21_2 is to be attached, a calibration of the sensors 21_1 and 21_2 used to measure the motion to be monitored is subsequently performed (S15). A calibration is, for example, processing for measuring an output value (an error component) of a sensor in a standstill state, the sensor being used to measure a motion to be monitored, and subtracting the error component from a measured value. In this example, a calibration of at least the sensors 21_1 and 21_2 is performed. However, the calibration is not limited to being performed on the sensors used to measure the motion to be monitored, and may be performed on all the sensors 21_1 to 21_11, for example, before display processing of a sensor icon corresponding to the paired sensor.

After the calibration has been completed, the sensors 21_1 and 21_2 are attached to the subject P (Step S16). Then, the motion to be monitored is measured based on a result of detection by each of the sensors 21_1 and 21_2 (S17).

Further, the result of the calculation indicating the motion state of the "bending and stretching of the right elbow" can be determined by, for example, a difference between the result of detection by the sensor 21_1 attached to the right upper arm (the body part p1) of the subject P and the result of detection by the sensor 21_2 attached to the right forearm (the body part p2) of the subject P. The motion state monitoring apparatus 10 generates a result of the calculation indicating the motion state of the "bending and stretching of the right elbow" based on the result of detection by each of the sensors 21_1 and 21_2. The display unit 11 displays the details of the result of measurement (e.g., a graphed result of measurement).

As described above, the motion state monitoring system according to this embodiment operates a sensor in accordance with the display form of a sensor icon. By doing so, it is possible to reduce the difficulty of determining which sensor a sensor icon corresponds to.

Note that the order of processes performed by the motion state monitoring system 1 is not limited to the order of processes shown in FIG. 6. For example, a calibration may be performed before display processing of a sensor icon corresponding to the paired sensor.

The motion state monitoring apparatus 10 may be a PC or a server that is not necessarily a personal computer.

Further, in the present disclosure, it is possible to implement all or some of the processes performed by the motion state monitoring system 1 by causing a Central Processing Unit (CPU) to execute a computer program.

The above-described program includes instructions (or software codes) that, when loaded into a computer, cause the computer to perform one or more of the functions described in the example embodiments. The program may be stored in a non-transitory computer readable medium or a tangible storage medium. By way of example, and not a limitation, non-transitory computer readable media or tangible storage media can include a Random-Access Memory (RAM), a Read-Only Memory (ROM), a flash memory, a Solid-State Drive (SSD) or other types of memory technologies, a CD-ROM, a Digital Versatile Disc (DVD), a Blu-ray (Registered Trademark) disc or other types of optical disc storage, a magnetic cassette, a magnetic tape, and a magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A motion state monitoring system configured to monitor a motion of a subject in accordance with a result of detection sent from each of a plurality of measuring instruments corresponding to a plurality of respective body parts of a body of the subject, the motion state monitoring system comprising:
   a display unit configured to display a plurality of sensor icons made to correspond to the plurality of respective measuring instruments; and
   a control unit configured to cause, in accordance with display forms of the plurality of the sensor icons, the plurality of measuring instruments corresponding to the respective sensor icons to perform operations different from each other,
   wherein the control unit executes processing for making a display color of each of the sensor icons identical to a light emitting color of a light emitting unit provided in the measuring instrument corresponding to the sensor icon.

2. The motion state monitoring system according to claim 1, wherein the control unit changes a display form of a selected sensor icon and causes the measuring instrument corresponding to the selected sensor icon to perform a predetermined operation.

3. The motion state monitoring system according to claim 2, wherein the predetermined operation is an operation for making the light emitting unit provided in the measuring instrument flash on and off.

4. The motion state monitoring system according to claim 2, wherein the predetermined operation is an operation for outputting a sound from the measuring instrument.

5. The motion state monitoring system according to claim 2, wherein the predetermined operation is an operation for vibrating the measuring instrument.

6. The motion state monitoring system according to claim 2, wherein the predetermined operation is an operation for emitting an aroma from the measuring instrument.

7. A method for controlling a motion state monitoring system configured to monitor a motion of a subject in accordance with a result of detection sent from each of a plurality of measuring instruments corresponding to a plurality of respective body parts of a body of the subject, the method comprising:
   causing a display unit to display a plurality of sensor icons made to correspond to the plurality of respective measuring instruments;
   causing, in accordance with display forms of the plurality of the sensor icons, the plurality of measuring instruments corresponding to the respective sensor icons to perform operations different from each other; and
   executing processing for making a display color of each of the sensor icons identical to a light emitting color of a light emitting unit provided in the measuring instrument corresponding to the sensor icon.

8. A non-transitory computer readable medium storing a control program for causing a computer to execute control processing in a motion state monitoring system configured to monitor a motion of a subject in accordance with a result of detection sent from each of a plurality of measuring instruments corresponding to a plurality of respective body parts of a body of the subject, the control processing comprising:

causing a display unit to display a plurality of sensor icons made to correspond to the plurality of respective measuring instruments;

causing, in accordance with display forms of the plurality of the sensor icons, the plurality of measuring instruments corresponding to the respective sensor icons to perform operations different from each other; and     executing processing for making a display color of each of the sensor icons identical to a light emitting color of a light emitting unit provided in the measuring instrument corresponding to the sensor icon.

* * * * *